United States Patent
Majila

(10) Patent No.: US 11,502,943 B2
(45) Date of Patent: Nov. 15, 2022

(54) DISTRIBUTED NEIGHBOR STATE MANAGEMENT FOR NETWORKED AGGREGATE PEERS

(71) Applicant: Hewlett Packard Enterprise Development LP, Houston, TX (US)

(72) Inventor: Rajib Majila, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 208 days.

(21) Appl. No.: 16/866,152

(22) Filed: May 4, 2020

(65) Prior Publication Data

US 2020/0366595 A1 Nov. 19, 2020

(30) Foreign Application Priority Data

May 14, 2019 (IN) .............................. 201941019262

(51) Int. Cl.
*H04L 45/24* (2022.01)
*H04L 45/00* (2022.01)
*H04L 45/021* (2022.01)
*H04L 47/125* (2022.01)

(52) U.S. Cl.
CPC .......... *H04L 45/245* (2013.01); *H04L 45/021* (2013.01); *H04L 45/72* (2013.01); *H04L 47/125* (2013.01)

(58) Field of Classification Search
None
See application file for complete search history.

(56) References Cited

U.S. PATENT DOCUMENTS

| 9,007,893 B2 | 4/2015 | Mohandas et al. |
| 9,973,444 B2 | 5/2018 | Yasuda |
| 2012/0182866 A1* | 7/2012 | Vinayagam ........... H04L 45/245 370/228 |
| 2016/0352622 A1* | 12/2016 | Gautam ................ H04L 49/201 |
| 2017/0257309 A1* | 9/2017 | Appanna ............. H04L 12/4641 |
| 2018/0302315 A1* | 10/2018 | Kamisetty ............ H04L 12/462 |
| 2018/0351855 A1* | 12/2018 | Sood ....................... H04L 45/28 |
| 2019/0007301 A1 | 1/2019 | Kadosh et al. |
| 2019/0089627 A1* | 3/2019 | Mirsky ................... H04L 45/50 |

FOREIGN PATENT DOCUMENTS

WO WO-2016122934 A1 8/2016

OTHER PUBLICATIONS

Juniper Net, Understanding Multichassis Link Aggregation, Jul. 14, 2016, pp. 1-12, Retrieved from the Internet on Jan. 7, 2019 from URL: <juniper.net/documentation/en_US/release-independent/nce/topics/concept/lag-multichassis-gfx-series-overview.html>.

* cited by examiner

*Primary Examiner* — Jenkey Van
(74) *Attorney, Agent, or Firm* — Hewlett Packard Enterprise Patent Department

(57) ABSTRACT

Methods for performing neighbor state management between peers of a Multi-Chassis Link Aggregation Group (MCLAG) are provided. In one method, a first peer of a Multi-Chassis Link Aggregation Group (MCLAG) performs state management for each neighbor entry in a first set of neighbor entries. Similarly, a second peer of the MCLAG connected in parallel with the first peer performs state management for each neighbor entry in a second set of neighbor entries, the second set of neighbor entries containing contain at least one neighbor entry absent from the first set of neighbor entries.

18 Claims, 7 Drawing Sheets

DISTRIBUTED NEIGHBOR STATE MANAGEMENT FOR NETWORKED AGGREGATE PEERS

BACKGROUND

The Data Link Layer is the second layer in the seven-layer Open Systems Interconnection (OSI) reference model used for network protocol design. The Data Link Layer is the network layer used to transfer data between, for example, adjacent network nodes in a wide area network or between nodes on the same local area network. Multi-Chassis Link Aggregation Group (MCLAG) is an approach for aggregating Ethernet links in the Data Link Layer across two different switches known as "MCLAG peers." While MCLAG peers are separate physical devices, they appear as a single logical device in the Data Link Layer. Because MCLAG peers are separate physical devices but appear as a single logical device, MCLAG peers can provide improved communications traffic throughput as one of the MCLAG peers handles part of the total traffic throughput while the other MCLAG peer handles the remaining traffic throughput. In addition, MCLAG peers provide redundancy, such that when one peer fails, the other peer continues to function while assuming the duties of the failed peer.

BRIEF DESCRIPTION OF THE DRAWINGS

Various examples of this disclosure that are proposed as examples will be described in detail with reference to the following figures, wherein like numerals reference like elements, and wherein.

DETAILED DESCRIPTION

Figure 1:
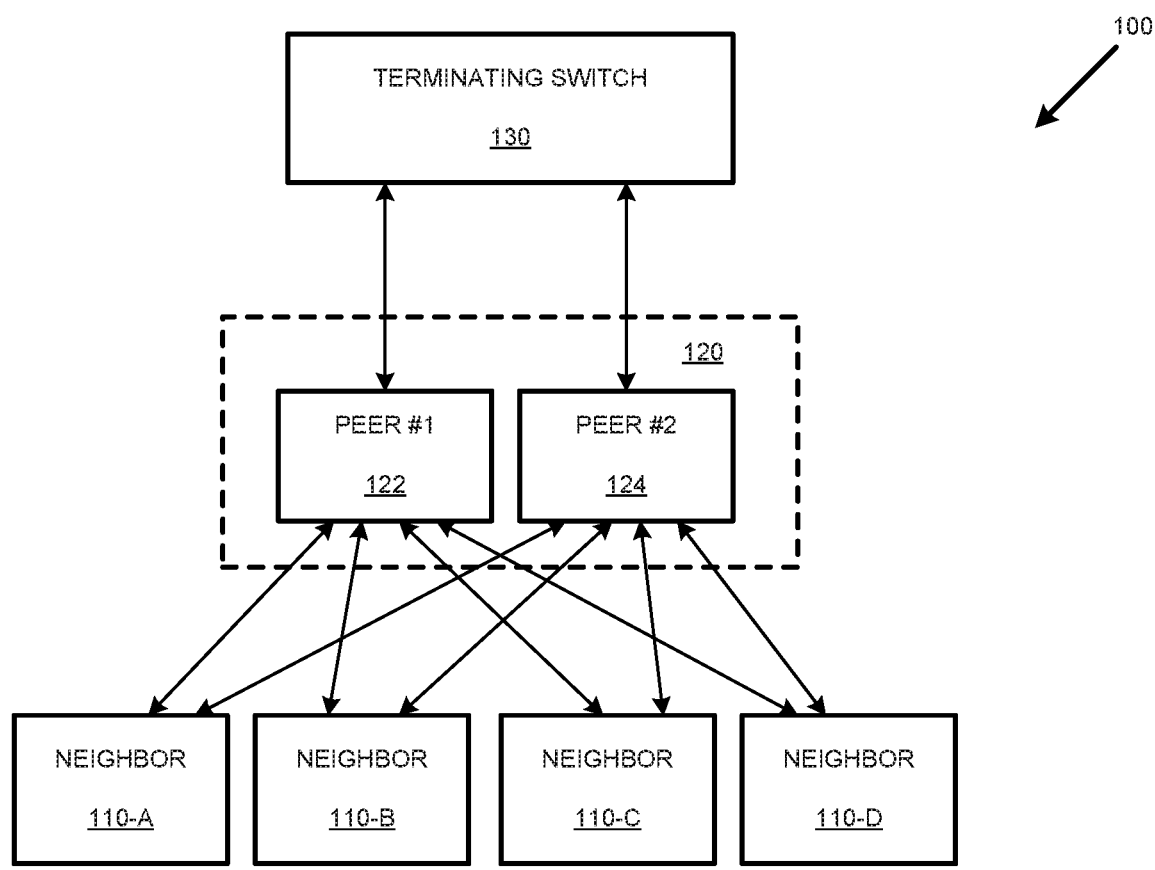
FIG. 1 depicts a communication system that uses an improved Multi-Chassis Link Aggregation Group (MCLAG) device that uses less processing overhead to manage communications in accordance with one or more examples of the disclosure.

The methods and systems disclosed below may be described generally, as well as described in terms of specific examples. For instances where references are made to detailed examples, it is noted that any of the underlying principles described are not to be limited to a single example but may be expanded for use with any of the other methods and systems described herein as will be understood by one of ordinary skill in the art unless otherwise specifically stated.

For the purposes of this disclosure, the term "Link Aggregation Group" (LAG) refers to various architectures that combine/aggregate multiple network ports in parallel in order to increase data throughput capacity beyond what a single port connection could sustain, as well as provide redundancy in case one of the parallel ports should fail. While a LAG combines a number of physical ports together to make a single high-bandwidth data path, logically these separate ports look like a single device at the Open Systems Interconnection (OSI) Data Link Layer.

The term "Multi-Chassis Link Aggregation Group" (MCLAG) is a LAG variant architecture that distributes LAG endpoints (e.g., ports) across multiple independent physical switches/devices. MCLAGs are usually implemented using two separate physical devices known as "MCLAG peers" (or simply "peers") arranged in parallel. By being in "parallel" it is meant that the MCLAG peers are separately communicatively coupled to one or more other devices, such as neighboring switches.

Due to the distributed nature of a MCLAG, an MCLAG deployment would be expected to support higher scales of connectivity and data throughput in terms of the number of connected devices used. For example, in theory two identical switches should be able to conduct twice the communications traffic. These MCLAG deployments also provide inherent redundancy as MCLAG peers can conduct communications traffic independently and can each act as back-ups for one another.

While MCLAG peers are typically discussed in the context of an Ethernet-based communications system, for the purposes of this disclosure, the term is expanded to encompass any standard of communications capable of accommodating the idea of an aggregate of two or more devices working in parallel at the Physical Layer that appear as a single device at the Data Link Layer.

To accommodate coordination between MCLAG peers, these devices exchange their respective state/status information over a specially designated link sometimes referred to as an "Inter-Switch Link" (ISL) by one particular vendor. However, for the purpose of this disclosure, such inter-peer links are more generally referred to as "Aggregate Peer Links" (APLs).

In order to accommodate those neighboring devices an MCLAG deployment is expected to serve, some form of data synchronization is used such that all MCLAG physical devices/peers will have the same information about neighboring devices using some form of neighbor-related tables/databases. As a result, MCLAG peers may end up managing a large number of neighbors irrespective of whether or not related communications traffic flows through a particular peer.

Generally, in MCLAG, once one peer discovers the presence of a new neighbor and reachability/connectivity is confirmed by that peer, reachability information (which may include MAC and/or physical/logical port information) is synchronized as an appropriate neighbor database entry is made by each of the peers through a centralized/duplicated database residing on both peers. Thereafter, both peers perform neighbor state management for all neighbor entries in the synchronized/duplicated database. For the purpose of this disclosure the term "neighbor state management" refers to the performance of a number of operations that a MCLAG or other device is tasked with in order to determine that a particular neighbor remains reachable after it has been discovered.

Such tasks may include, for example, determining the length of time that a particular neighbor communicated with a MCLAG peer. Such tasks may also include repeatedly sending the particular neighbor a probe message (e.g., an ARP request (for IPv4) and/or neighbor solicitation (for IPv6)) designed to determine a neighbor's continued existence and/or responsiveness, then receiving an appropriate response to the probe message in order to determine that the particular neighbor is still in communicative contact. Accordingly, "neighbor state management" includes managing a "probe state" reflective of such communicative contact.

By way of example, after any or all of a prolonged absence of a communication with the particular neighbor, a failure of a neighbor to respond to a set number of probes, and/or a failure of a neighbor to respond to probes over a designated time period, MCLAG peers can determine whether a particular neighbor state is to be considered a non-responsive state and/or a failed state, and the respective neighbor entry should be removed from a database/set of known neighbors. For example, according to the disclosed methods and systems, a time period (e.g., 30 seconds to 30 minutes) may be set where after when no probing message and/or other communication has been received from a particular neighbor, the respective neighbor entry can be removed from any database of known neighbors. As an alternative, a neighbor state may be considered non-responsive/failed after N number of probes have resulted in no reply where after the respective neighbor entry can be removed from any database of known neighbors.

The synchronization of neighbor entries between peers may inflate the overhead processing used to perform neighbor state management. That is, since entries in neighbor databases are independently and actively managed by both peers for all recognized neighbors, this places substantial additional overhead in each of the peers when considering each peer will only be handling about half of the neighbors and/or overall communications traffic under the most ideal load distributed conditions.

The examples disclosed herein address these technical problems by providing load balancing of neighbor state management between peers. Such a load-balancing of neighbor state management ensures the distribution of state neighbor management processes across peers so that the processing of neighbor state management information is evenly distributed or nearly evenly distributed. That is, the examples disclosed herein provide methods and systems for defining a "home" peer for each neighbor in communication with a MCLAG and methods and systems for the "home" peer to perform appropriate neighbor state management.

The advantages of the disclosed methods and systems include: (1) the removal of the overhead burden of running a neighbor state machine for a neighbor managed by other devices/peers, thus aiding in higher scalability in terms of the number of neighbor that can be supported in an MCLAG setting; and (2) the removal of any inconsistency that may arise out of running the state machine for the same neighbor independently in both of the peer devices.

While each peer could still share a common neighbor database with the other peer and update such neighbor database as appropriate to assure redundancy of information should one peer fail; such a sharing of neighbor information uses little processing overhead.

Turning to FIG. 1, a communication system 100 is depicted that includes a first set/number of neighbors 110-A, . . . 110-D communicatively coupled to each other and to Terminating Switch 130 via an MCLAG 120 composed of a first peer 122 and a second peer 124. While the example communication system 100 is an Ethernet-based system and the example MCLAG 120 contains only two peers 122 and 124, in other examples the communication system 100 may take the form of a wide variety of communications technologies and that the MLAG 120 may not be limited to two peers.

A "terminating switch" is a device that links some number of devices (e.g., customer-premises equipment (CPE)) to a network and serves as a last point of connection between a network and the other device(s). It should be appreciated, however, that FIG. 1 describes an example network configuration and that, in various other examples, the MCLAG need not necessarily be so coupled to a terminating switch.

A "neighbor" may be any type of device that may operate on a network, such as a switch, a VPN concentrator, a WLAN device, and so on.

The first peer 122 and the second peer 124 are both switches that, in various examples, may vary as to technology (electrical, optical, etc.) and type (e.g., routers).

During operation, the MCLAG 120 can receive communications from any neighbor 110-A, . . . 110-D and forward the communications to the Terminating Switch 130. As the MCLAG 120 facilitates communications between the various neighbors 110-A, . . . 110-D, each peer 122 and 124 of the multi-chassis link aggregate group 120 performs a number of processes deigned to learn about the various neighbors in communication with the MCLAG 120 and perform respective neighbor state management in a way that reduces overhead as compared to known MCLAG systems.

More particularly, the example MCLAG 120 uses a modified learning process that represents a change in the way learning happens for MCLAG peers. For example, when a new entry becomes available for learning in either of the example peers 122 or 124, the example peers 122 or 124 may, for example, execute one of the following five non-limiting approaches to decide the "home" peer for managing a particular neighbor. In varying examples, the approach used for determining the "home" peer can be configured by a user (e.g., a system administrator) depending on the nature of the desired load-balancing.

Once the "home" peer has been identified for a newly-identified/discovered neighbor by one of the peers 122 or 124, one of two actions may be taken.

Specifically, if a particular peer determines that it will not be responsible for performing neighbor state management for a particular neighbor, the particular peer will notify the other peer about the existence of the new neighbor where after the other neighbor will perform neighbor state management for the new neighbor.

On the other hand, if the peer that discovers the new neighbor is the home peer, the other peer need not perform neighbor state management for the new neighbor.

For the purposes of this disclosure, the term "disjunctive" refers to non-overlapping processes or non-overlapping data. For example, two separate communications devices that perform state management for no common device perform disjunctive neighbor state management. Similarly, two sets of data are "disjunctive" if each set of data contains only entries not found in the other database. Multiple sets of data that contain at least one common entry and at least one different entry are considered to be "partially overlapping."

Also for the purposes of this disclosure, a "set" of data may refer to any collection of data including an individual database or a portion of a database. By way of example, a first and second set of data that are disjunctive may together make up a single database so long as there is some logical or other means to distinguish a particular database entry as being in the first set or the second set.

Turning back to FIG. 1, peers 122 and 124 may determine home peer determination for the purposes of neighbor state management. According to various non-limiting examples of this disclosure, five approaches to peer determination are disclosed. A network/device administrator can choose from among these five approaches or may opt to choose another approach depending upon different criteria, such as simplicity/low overhead of selection and a desired level of load-balancing. That is, while different load-balancing approaches can place different levels of processing overhead on a system running a load-balancing scheme, such overhead can be weighed against the potential evenness of load distribution.

Example Approach Number 1: Virtual Routing and Forwarding (VRF) based load-balancing. Virtual routing and forwarding is a technology included in Internet Protocol (IP) network routers used to, among other things, create Virtual Private Networks (VPNs) for customers. Virtual Routing and Forwarding acts like a logical router (i.e., a partition of a physical router), but while a logical router may include many routing tables, a VRF instance uses only a single routing table. Virtual Routing and Forwarding also incorporates a forwarding table that designates the next "hop" for each data packet, a list of devices that may be called upon to forward the packet, and a set of rules and routing protocols that govern how the packet is forwarded. These tables prevent individual data packets from being forwarded outside a specific VRF path while also keeping out traffic that should remain outside the VRF path.

In the VFR load-balancing approach, neighboring devices are distributed across a set of peers based on any VRF imposed on a neighbor. Thus, in this approach all neighbors belonging to one VRF will be managed by one peer. While VRF load-balancing uses little processing overhead, VRF load-balancing may not provide even load-balancing if the distribution of neighbors in different VRFs is skewed.

Example Approach Number 2: port based load-balancing. The port-based load-balancing approach, also called flow-based load-balancing, identifies different flows of traffic based on the key fields in the data packet. By way of example, source and destination IP addresses can be used to identify various data traffic flows, which are then mapped to the different member links of a port channel. After the mapping is done, the data traffic for a flow is transmitted through the assigned member link. This form of load-balancing can use a fast hashing algorithm on the source and destination IP addresses along (optionally with the transport layer port number) to provide a unique identifier. The unique identifier, in turn, may be used to assign a traffic flow to a particular peer, e.g., even-numbered identifiers to one peer, odd-numbered identifiers to another peer. Generally, port-based load-balancing a simple low-overhead approach and can provide a better load-balancing as compared to the VRF based load-balancing while observing that traffic skew is still possible based on how the neighbors are distributed according to particular data flows.

Example Approach Number 3: Internet Protocol (IP) based load-balancing. In this approach, "home" peer selection happens based on the IP address of the neighbor. It employs a simple distribution mechanism of using odd numbered last octet in the IP address being "home" at one station and even numbered ones being homed in another one. This approach can provide a better distribution of neighbors across the two stations than the previously-mentioned approaches. However, in some examples, the concept of odd and even numbering need not depend on the last octet in the IP address or at least only on the last octet in the IP address. For example, in varying embodiments the last two octets of an IP address may be added to produce an even or odd number, and in other examples a hash of IP addresses may be used to produce an even or odd number.

Example Approach Number 4: Medium Access Control (MAC) based load-balancing. Medium Access Control can be implemented in a manner similar to IP based load-balancing while using MAC addresses (instead of the IP addresses) for determining a "home" peer.

Example Approach Number 5: First Seen Approach. In this approach, the "home" peer is designated based on which peer first identifies/discovers a particular neighbor. Each new neighbor observance results in a time stamp of the event by each individual peer. Subsequently, handshaking is performed between peers to determine which peer first observed the new neighbor. The peer with the earliest time stamp is then selected as the "home" peer. This approach has an advantage of the station forwarding a host being selected as the "home" station if the traffic from the host flow through one of the peers only. However, the handshaking used in this approach represents additional overhead and some form of clock-synchronization is incumbent.

Once home peer selection for a new communication type is determined, the various peer 122 and 124 of FIG. 1 can perform distributed neighbor management in a fashion that avoids redundant processing. This is in contrast to previous approaches to managing neighbors by MCLAG peers. That is, once the "home" peer is determined, the responsibility of performing state management for the neighbor will rest with only the home peer. Accordingly, the peer selected as the "home" peer for a given neighbor will execute the appropriate processes that perform neighbor state management while the other peer device will not manage the state of the neighbor.

Figure 2:
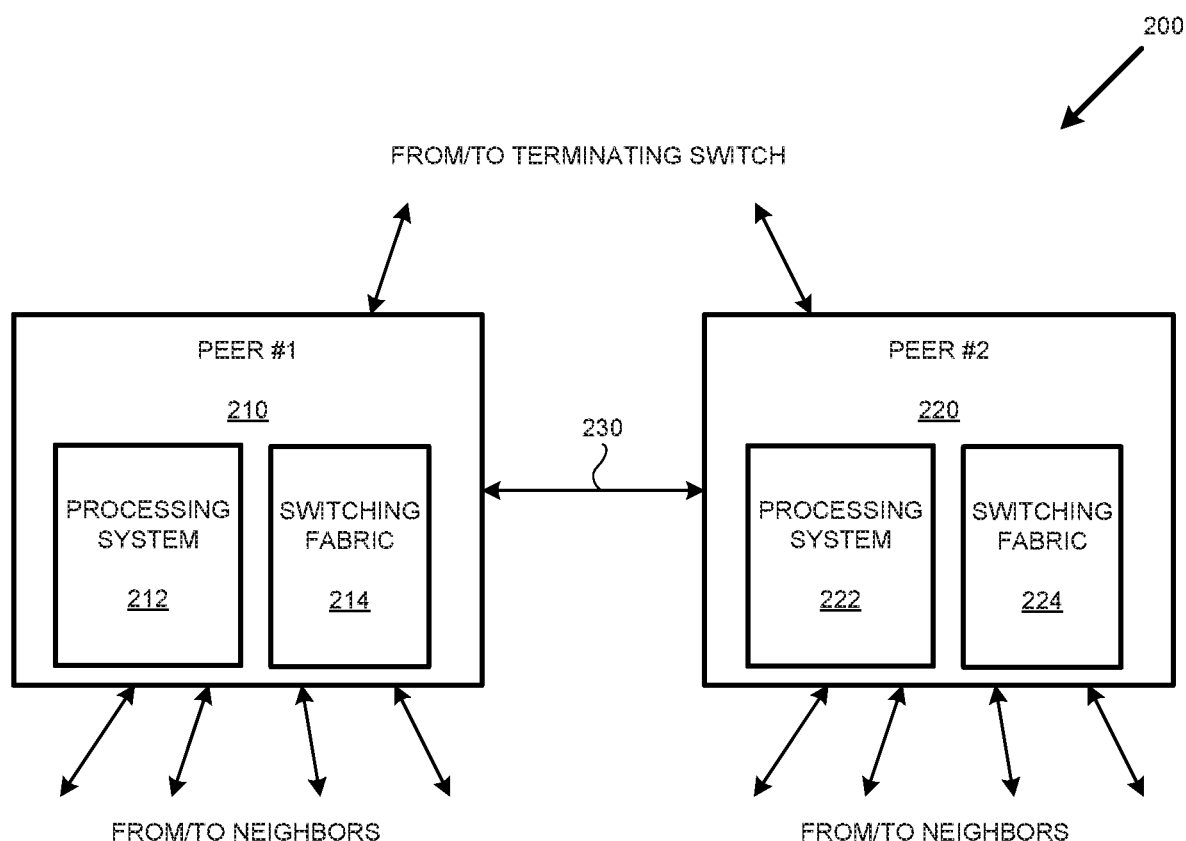
FIG. 2 is a diagram depicting details of an improved Multi-Chassis Link Aggregation Group system in accordance with one or more examples of the disclosure.

FIG. 2 is a diagram depicting details of an improved Multi-Chassis Link Aggregation Group system 200. As shown in FIG. 2, the improved Multi-Chassis Link Aggregation Group system 200 includes a first peer 210 and a second peer 220 communicatively linked by APL 230. As is also shown in FIG. 2, the first peer 210 includes a first processing system 212 that controls a first switching fabric 214, and the second peer 220 similarly includes a second processing system 222 that controls a second switching fabric 224.

During operation, each respective processing system 212 and 222 is responsible for: (1) determining which peer will be a home peer for a given neighbor communication, and (2) managing the appropriate databases that direct the respective switching devices 214 and, 224 to control communications traffic among neighbors.

The respective processing systems 212 and 222 provide each peer 210 and 220 with a versatile collection of software/firmware-based processes that in turn can provide high-level management functions that are described below in detail.

In contrast to the software/firmware-based processing systems 212 and 222, the switching fabrics 214 and 224 (under the control of their respective processing systems 212 and 222) are programmable machines that enable each peer 210 and 220 to provide fast communications in a manner that a sequential instruction machine (i.e., a software/firmware processing device) could not. "Switching fabrics" as used herein generally refer to an interconnect architecture used by a switching device to redirect incoming data received at one port to a particular output port.

Figure 3:
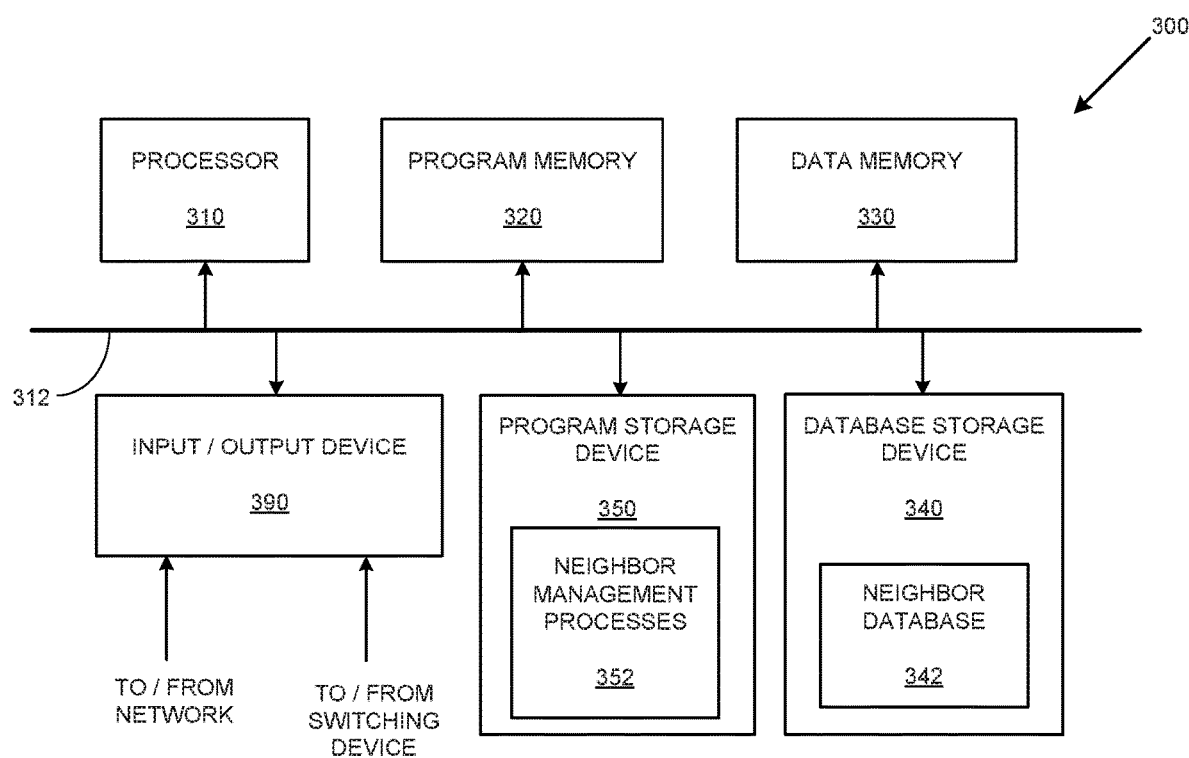
FIG. 3 is a block diagram of a processing system for a peer of an improved Multi-Chassis Link Aggregation Group in accordance with one or more examples of the disclosure.

FIG. 3 is a block diagram of a processing system 300 for a peer a Multi-Chassis Link Aggregation Group according to the examples disclosed herein. As shown in FIG. 3, the example processing 300 includes a processor 310 (e.g., a CPU), a program memory 320, a data memory 330, a database storage device 340, a program storage device 350, and an input/output device 390. The above components 310-390 are communicatively coupled together by a control/data bus 312.

The example data memory 330 and program memory 320 can be any type of machine readable devices, such volatile and/or non-volatile random access memories. Similarly, the database storage device 340 and the program storage device 350 may be any form of machine readable device suitable for storing data, such as an optical storage disc system, a magnetic storage device, electrically-erasable memories, and so on. The example input/output device 390 is a combination of serial and parallel interfaces suitable to allow the example processing system 300 to interact with a number of external devices, such as a remote computer terminal and/or computer-based equipment.

Although the example processing system 300 of FIG. 3 uses a control/data bussed architecture, any other architecture may be used as is well. For instance, in various examples, the various components 310-390 can take the form of separate electronic components coupled together via a series of separate busses.

Still further, in other examples, one or more of the various components 310-390 can take form of separate servers coupled together via one or more networks. Additionally, each of components 310-390 can be realized using multiple computing devices employed in a cooperative fashion. For example, by employing two or more separate computing devices, e.g., servers, to provide separate processing and data-handling needs, processing bottlenecks can be reduced/eliminated, and the overall computing time may be significantly reduced.

Some processing that are implemented in software/firmware routines residing in program memory 320, alternatively may be implemented using dedicated processing logic, such one or more Application Specific Integrated Circuit (ASICs), discrete logic designs, and specialized processing modules (e.g., modules designed to perform single-cycle multiply/accumulate operations). Still further, some processing may be performed by software/firmware processes residing in separate memories in separate servers/computers being executed by different controllers.

In operation, the example processing device 300 can first perform a number of setup operations including transferring an operating system (with kernel) and a number of appropriate program(s)/process(es) from the program storage device 350 to the program memory 320. In the present example of FIG. 3, a number of management processes 352 (e.g., instruction-based software and/or firmware based programs) are used to, for example, manage one or more neighbor databases and/or sets of neighbors, perform neighbor state management, conduct communications traffic for the MCLAG peer, and exchange information with one or more peers using, for example, an APL or other inter-peer communication path.

In addition, setup operations may include transferring an existing neighbor database 342 from the database storage device 340 to the data memory 330 so as to allow the processor 310 to quickly access and manipulate data in the data memory 330 as opposed to the processor 310 manipulating data in a device more suitable for long-term storage than for quick access.

Subsequent operations of the example processing device 300 are discussed below with respect to FIGS. 4-7.

Figure 4:
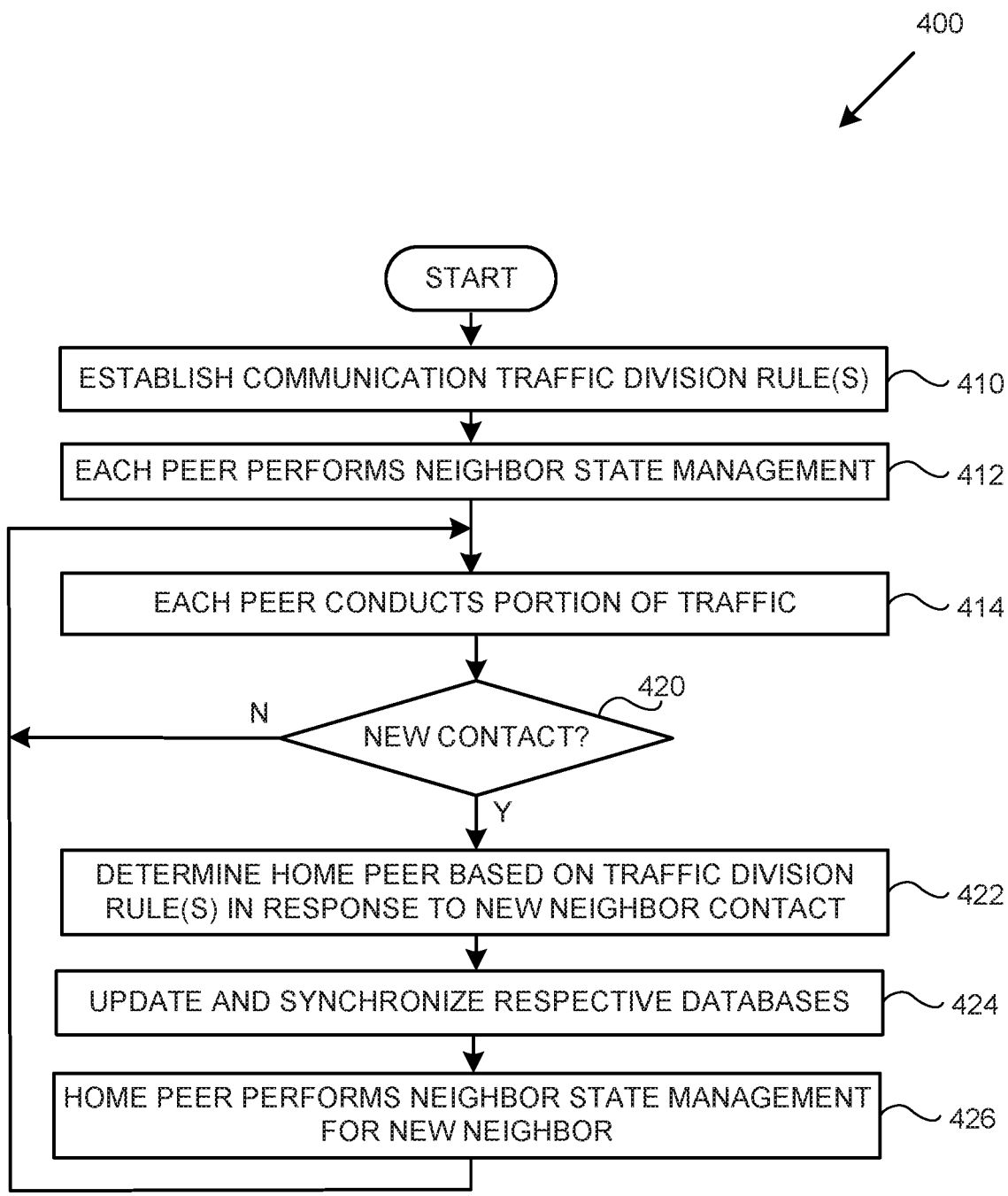
FIG. 4 is a flowchart depicting a method for operating an improved Multi-Chassis Link Aggregation Group peer having reduced processing overhead in accordance with one or more examples of the disclosure.

FIG. 4 is a flowchart of a method 400 for operating an improved Multi-Chassis Link Aggregation Group peer having reduced processing overhead. To those skilled in the art in light of this disclosure that, while the various operations of FIG. 4 are shown according to a particular order for ease of explanation, that certain operations may be performed in different orders or performed in a parallel fashion. Additionally, certain operations may be omitted in some examples.

The method 400 starts in operation 410 where one or more rules used to establish the division of neighbor state management is established. As is discussed above, in a number of examples the division of neighbor state management may be based on a Virtual Routing and Forwarding (VRF) based load-balancing approach, a port based load-balancing approach, an IP based load-balancing approach, a MAC based load-balancing approach, and a first seen load-balancing approach. However, the various expressly-mentioned load-balancing approaches are non-limiting examples and other load-balancing techniques may be used. By way of example, a load-balancing approach may be based on nothing more than a source IP address located within a communications packet and/or a destination IP address located within a communications packet.

In operation 412, each peer of the MCLAG performs neighbor state management for its respective set of neighbors. By way of example, a first peer of the MCLAG can use one or more first processes (programs) to perform neighbor state management for a first set of neighbor entries. Further, a second peer of the MCLAG (connected in parallel with the first peer) can use one or more second processes to perform neighbor state management for a second set of neighbors.

In order to reduce processing overhead, it is beneficial to cause each set of neighbors (whether or not both neighbor sets reside in a single database or multiple databases) to contain at least one neighbor entry that is absent from the other set of neighbors. However, to employ much improved processing overhead it is useful for MCLAG peers to employ processes that, during normal operation, cause the first set of neighbors to be disjunctive from the second set of neighbors. Thus, a first neighbor database may contain a first set of neighbor entries that direct the first portion of neighbor state management and the second neighbor database may contain a second set of neighbor entries that direct the second portion of neighbor state management noting that each of the first set of neighbor entries and each of the second set of neighbor entries are non-redundant. As discussed above, such separation of neighbor entries may be the result of peer selection (e.g., a hash of a MAC address). Alternatively, a single database may contain the first set of neighbor entries and the second set of neighbor entries.

For the purposes of this disclosure, the term "normal operation" refers to the expected operation of a processing device that is not suffering from some form of software or hardware failure. By way of example, an MCLAG peer may be considered running under normal operation if such MCLAG peer performs the switching operations, the management operations, and all other operations the MCLAG peer is designed perform.

In contrast to normal operation, the terms "failure" and "failed" refer to any number of states whereby an MCLAG peer (or other device) does not operate as expected under conditions the MCLAG peer (or other device) was design to perform under. Such failures may take the form of a hardware failure (e.g., a processor chip has malfunctioned and can no longer execute program instructions) or may take the form of a software failure (e.g., a stack overflow has occurred causing a processor to overwrite program instructions). Failed MCLAG peers are sometimes, but not necessarily, recognized as failed when they no longer provide what is known as a "heartbeat" signal to another MCLAG peer.

Still further, other management processes may be employed to enable the sharing of independent neighbor databases among peers. By way of example, using any number of management processes the first peer may provide copies, including updated copies, of the first neighbor database (containing a first set of neighbor entries) to the second peer via an APL or other communication link. Similarly, the second peer may provide copies, including updated copies, of the second neighbor database (containing a second set of neighbor entries) to the first peer. The sharing of neighbor databases wholly managed by another peer does not require substantial processing overhead. As an alternative, one or more various management processes may allow for the synchronization of a single database containing both the above-mentioned first and second sets of neighbor entries.

In operation 414, each peer of the MCLAG conducts a portion of neighbor state management for the MCLAG noting that, during normal operation, the first peer will conduct a first portion of neighbor state management for neighboring devices based on neighbor entries in the first set of neighbor entries while the second peer will conduct a second portion of neighbor state management for neighboring devices based on neighbor entries in the second set of neighbor entries. That is, neighbor entries in the first set of neighbor entries will direct the first portion of neighbor state management with neighboring devices while neighbor entries in the second set of neighbor entries will direct the second portion of neighbor state management with neighboring devices noting that the first and second sets of neighbor entries represent all neighbors for a MCLAG. Because the respective neighbor sets are disjunctive, the first portion of neighbor state management will be disjunctive with the second portion of neighbor state management.

In operation 420, a determination is made as to whether a new neighbor is observed/discovered. Based on the determination that a new neighbor is observed/discovered, the method 400 continues to operation 422; based on a determination that a new neighbor is not observed/discovered, the method 400 jumps back to operation 414.

In operation 422, using the communications traffic division rules of operation 410 a home peer is determined in response to the new neighbor contact. Next, in operation 424 the home peer only updates its set of neighbor entries to include an additional neighbor entry based on the new contact, and the sets of neighbor entries (whether in one or separate databases) in each MCLAG peer are synchronized. Then, in operation 426 the home peer of the MCLAG performs neighbor state management for the new neighbor, and the method 400 jumps back to operation 414.

Figure 5:
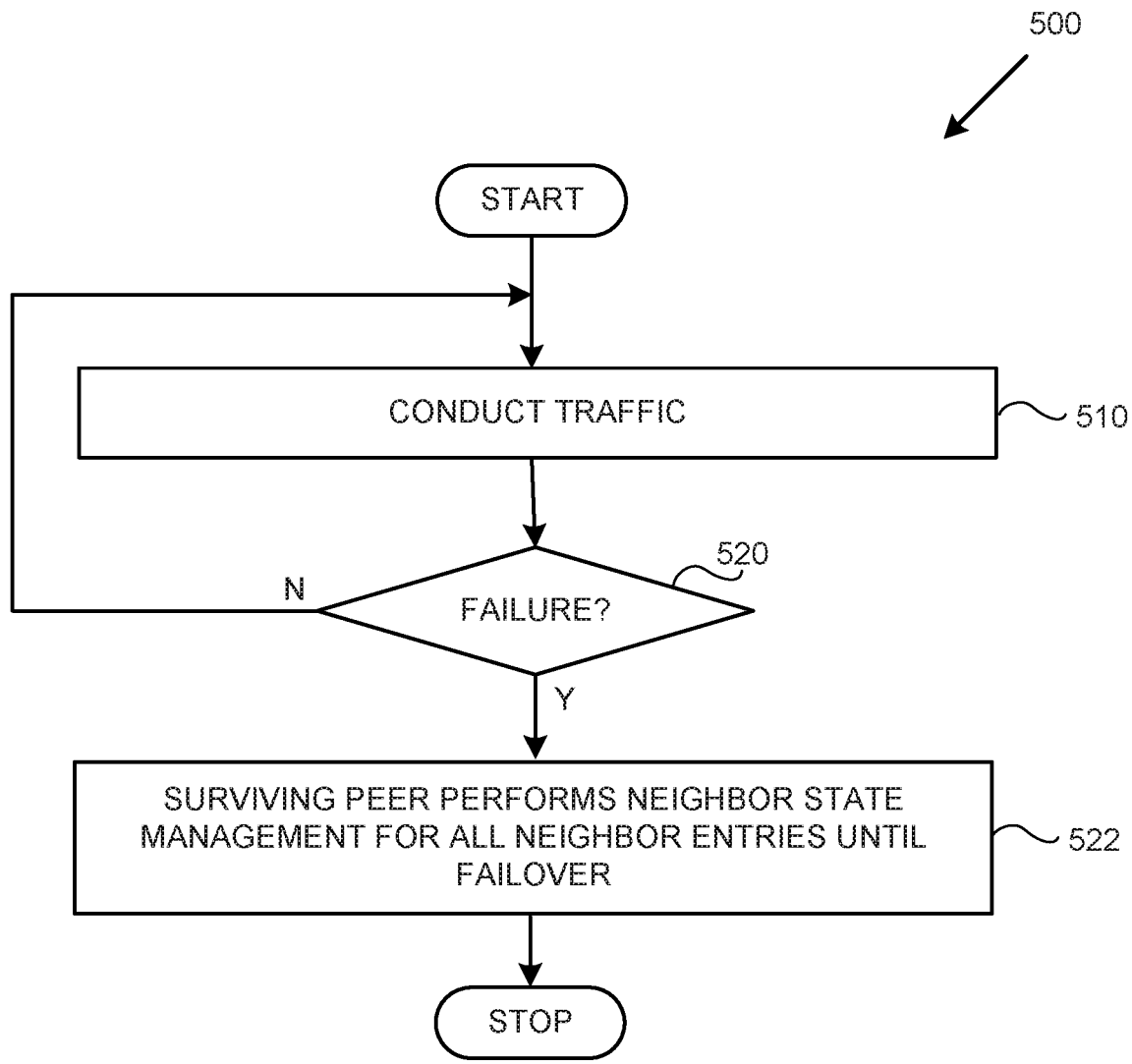
FIG. 5 is a flowchart depicting a method for operating an improved Multi-Chassis Link Aggregation Group in response to a peer failure in accordance with one or more examples of the disclosure.

FIG. 5 depicts a flowchart of a method 500 usable for operating an improved MCLAG in response to a peer failure. It is to be appreciated to those skilled in the art in light of this disclosure that, while the various operations of FIG. 5 are shown according to a particular order for ease of explanation, that certain operations may be performed in different orders or performed in a parallel fashion. It is to be further appreciated that certain operations may be omitted in some examples.

The method 500 starts in operation 510 where each peer in a MCLAG conducts traffic and neighbor state management according to a normal mode of operation. At operation 510 it is assumed that each peer of the MCLAG has maintained its respective set of neighbor entries/neighbor database and has shared its respective set of neighbor entries with every other MCLAG peer such that all shared sets of neighbor entries are current. While sets of neighbor entries may be shared via a dedicated link, such as the above-discussed APL, in various examples sets of neighbor entries/neighbor databases may be shared via other means such as a packet-based data transfer over the various input/output ports of each peer.

In operation 520 a determination is made by a given peer as to whether the other peer has failed and/or the APL connecting two peers has failed. Such a determination may be made based on any number of indicators, such as an absence of a health signal from the other peer or the absence of some expected activity. Based on a determination that one or both of the APL and the other peer has failed, the method 500 continues to operation 522; based on a determination that one or both of the APL and the other peer has not failed, the method 500 jumps back to operation 510.

In the current method 500, it is presumed that each neighbor entry in both of the above sets of neighbor entries/neighbor databases is current and shared/synchronized. Accordingly, in operation 524, the operational (non-failed) peer performs neighbor state management for all neighbor entries in both the first and second sets of neighbor entries until a failover event indicates that the failed peer or APL has been restored or replaced.

Figure 6:
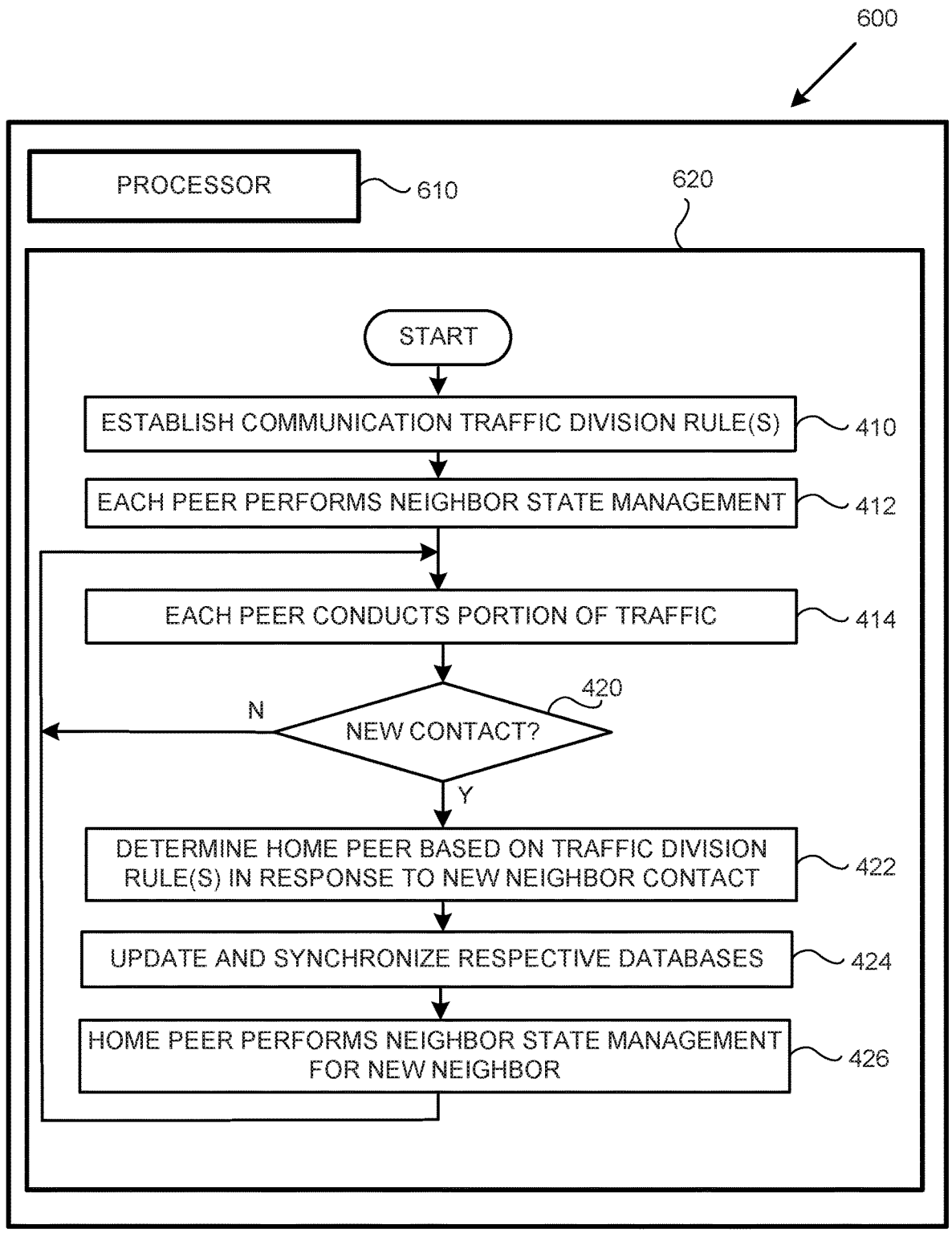
FIG. 6 depicts a processor communicatively connected to a storage device containing instructions for operating an improved Multi-Chassis Link Aggregation Group peer in accordance with one or more examples of the disclosure.

FIG. 6 depicts a processor 610 communicatively connected to a computer program product/storage device 620 containing instructions 410-422 for operating an improved Multi-Chassis Link Aggregation Group peer. The computer program product/storage device 620 is a non-transient computer-readable storage memory containing a plurality of instructions 410-426 such that, when operated upon by a processing system that includes the processor 610 and a memory communicatively coupled to the processor 610 (e.g., one or both of the memories 320-330 of FIG. 3), causes the processor 610 to perform a number of operations consistent with the flowchart of FIG. 4. Because the operations of FIG. 4 have already been described in detail, such operations need not be repeated as an issue of brevity.

Figure 7:
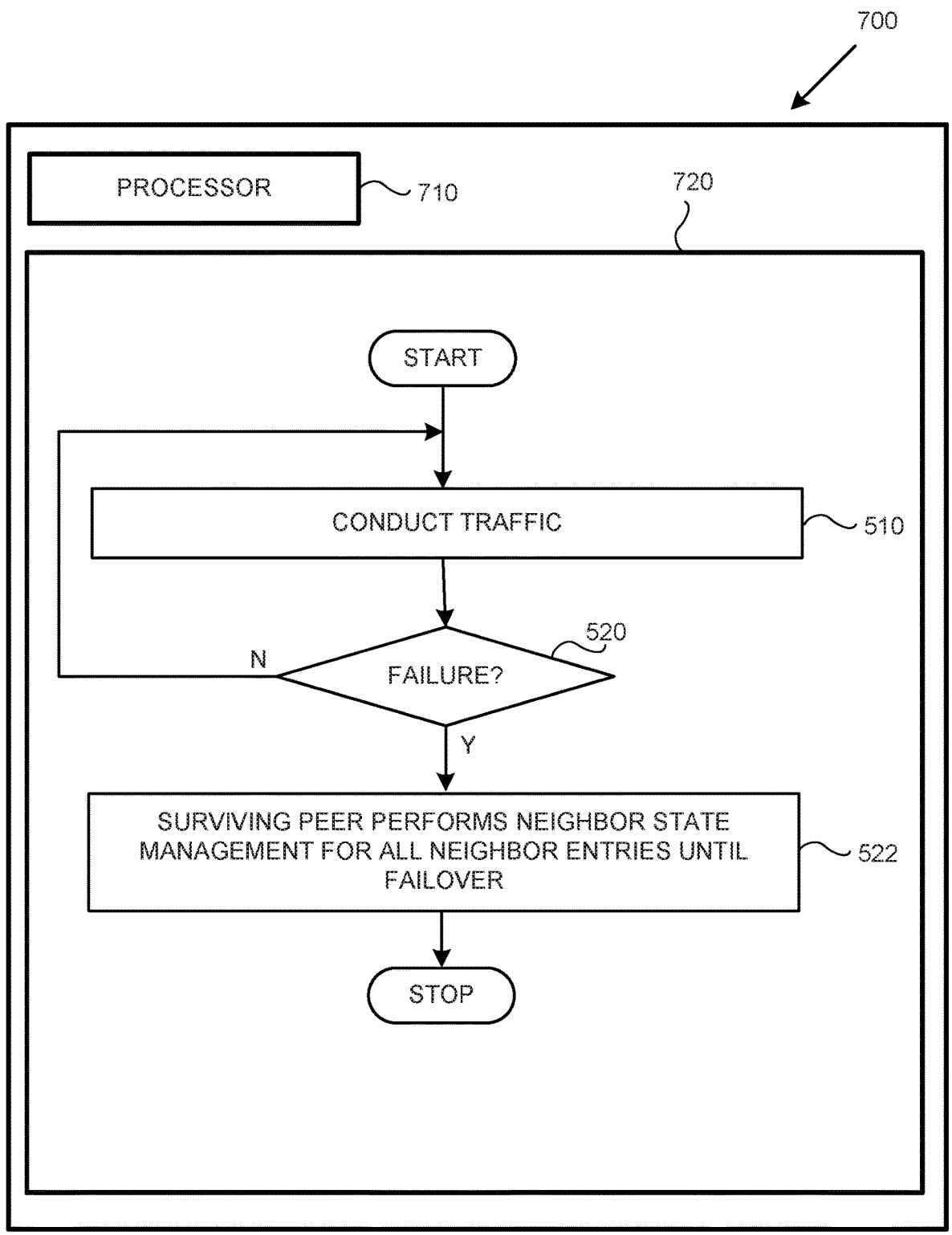
FIG. 7 depicts a processor communicatively connected to a storage device containing instructions for operating an improved Multi-Chassis Link Aggregation Group in response to a peer failure in accordance with one or more examples of the disclosure.

Similar to FIG. 6, FIG. 7 depicts a processor 710 communicatively connected to a computer program product/storage device 720 containing instructions 510-524 for operating an improved Multi-Chassis Link Aggregation Group peer in the event of a peer failure. The computer program product/storage device 720 is a non-transient computer-readable storage memory containing a plurality of instructions 510-524 such that, when operated upon by a processing system that includes the processor 710 and a memory communicatively coupled to the processor 710 (e.g., one or both of the memories 320-330 of FIG. 3), causes the processor 710 to perform a number of operations consistent with the flowchart of FIG. 5. Because the operations of FIG. 5 have already been described in detail, such operations need not be repeated as an issue of brevity.

In various examples the above-described systems and/or methods may be implemented using any form of known or later-developed circuitry (e.g., electronic, optical) or programmable device, such as a computer-based system or programmable logic. It should be appreciated that the above-described systems and methods can be implemented using any of various known or later developed programming/scripting languages, such as "Perl," "Object Pascal," "Pascal" "SQL," "C," "C++," "FORTRAN," "Python," "VHDL" and the like.

Accordingly, various storage media, such as magnetic computer disks, optical disks, electronic memories or any other form of non-transient computer-readable storage memory, can be prepared that can contain information and instructions that can direct a device, such as a computer, to implement the above-described systems and/or methods. Such storage devices can be referred to as "computer program products" for practical purposes. Once an appropriate device has access to the information and programs contained on the storage media/computer program product, the storage media can provide the information and programs to the device, thus enabling the device to perform the above-described systems and/or methods. Unless otherwise expressly stated, "storage medium" is not an electromagnetic wave per se.

For example, if a computer disk containing appropriate materials, such as a source file, an object file, an executable file or the like, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods and coordinate the functions of the individual systems and/or methods related to database-related services.

While the methods and systems above are described in conjunction with specific examples, it is evident that many alternatives, modifications, and variations will be apparent to those skilled in the art. Accordingly, the examples above as set forth herein are intended to be illustrative, not limiting. There are changes that may be made without departing from the scope of the present disclosure.

What is claimed is:

1. A communication system, comprising:
    a first peer of a Multi-Chassis Link Aggregation Group (MCLAG) wherein the first peer is to perform neighbor state management for a first set of neighbors; and
    a second peer of the MCLAG connected in parallel with the first peer, wherein the second peer is to perform neighbor state management for a second set of neighbors;
    wherein in response to discovering a new neighbor, the first peer and the second peer are to use a neighbor state management load-balancing process to determine a home peer, which is one of the first peer and second peer, for the newly discovered neighbor;
    wherein in response to being determined as the home peer, the first or second peer performs neighbor state management for the newly discovered neighbor, which comprises maintaining reachability information associated with the newly discovered neighbor; and
    wherein the first set of neighbors managed by the first peer has at least one different neighbor from the second set of neighbors managed by the second peer, thereby facilitating load balancing of neighbor state management between the first peer and second peer.

2. The communication system of claim 1, wherein:
    the first set of neighbors and the second set of neighbors include all neighbors in the MCLAG.

3. The communication system of claim 1, wherein during normal operation the first set of neighbors is disjunctive from the second set of neighbors.

4. The communication system of claim 1, wherein corresponding entries for the first set of neighbors and corresponding entries for the second set of neighbors reside in respective databases in both the first peer and the second peer.

5. The communication system of claim 4, wherein during normal operation the first peer and the second peer synchronize databases containing the neighbor entries correspond to the first set of neighbors and the neighbor entries correspond to the second set of neighbors in response to the first set of neighbors being updated so as to include at least one additional neighbor.

6. The communication system of claim 5, wherein the first peer and the second peer synchronize databases using an Aggregate Peer Link (APL).

7. The communication system of claim 6, wherein the second peer performs neighbor state management for both the first set of neighbor entries and the second set of neighbor entries in response to a failure of at least one of the first peer and the APL.

8. The communication system of claim 1, wherein the respective neighbor state management process for both the first peer and the second peer is based on at least a source Internet Protocol (IP) address located within a communications packet.

9. The communication system of claim 8, wherein the respective neighbor state management load-balancing process for both the first peer and the second peer is further based on a destination IP address located within the communications packet.

10. The communication system of claim 1, wherein the respective neighbor state management load-balancing process for both the first peer and the second peer is based on a Virtual Routing and Forwarding (VRF) approach.

11. The communication system of claim 1, wherein the respective neighbor state management load-balancing process for both the first peer and the second peer is based on a Medium Access Control (MAC) address of a neighbor.

12. A communication method, comprising:
    performing neighbor state management for a first set of neighbors in a Multi-Chassis Link Aggregation Group (MCLAG), the first set of neighbors containing neighbor entries that direct a first peer of the MCLAG to conduct neighbor state management for the first set of neighbors;
    performing neighbor state management for a second set of neighbors in the MCLAG group, the second set of neighbors containing at least one neighbor absent from the first set of neighbors, the second set of neighbors containing neighbor entries that direct a second peer of the MCLAG to conduct neighbor state management for the second set of neighbors;
    discovering a new neighbor;
    performing a neighbor state management load-balancing process to determine a home peer, which is one of the first peer and second peer, for the newly discovered neighbor; and
    performing, by the determined home peer, neighbor state management for the newly discovered neighbor, which comprises maintaining reachability information associated with the newly discovered neighbor.

13. The communication method of claim 12, wherein the first set of neighbors and the second set of neighbors include all neighbors in the MCLAG.

14. The communication method of claim 13, wherein during normal operation the first set of neighbors disjunctive from the second set of neighbors.

15. The communication method of claim 12, wherein the neighbor state management load-balancing process is based on at least one of:
    a source Internet Protocol (IP) address located within a communications packet;
    a destination IP address located within the communications packet;
    a Virtual Routing and Forwarding (VRF) approach; and
    a Medium Access Control (MAC) address of a neighbor.

16. The communication method of claim 12, wherein the neighbor entries correspond to the first set of neighbor the neighbor entries correspond to the second set of neighbors reside in respective databases in both the first peer and the second peer, and wherein during normal operation the first peer and the second peer synchronize databases in response to the first set of neighbors updated so as to include at least one additional neighbor.

17. The communication method of claim 16, further comprising:
    the second peer performing neighbor state management for both the first set of neighbors the second set of neighbors response to a failure of at least one of the first peer and an Aggregate Peer Link (APL) communicatively connecting the first peer and the second peer.

18. A computer program product, comprising:
    a non-transient computer-readable storage memory containing a plurality of instructions such that, when operated upon by a processing system that includes a processor and a memory communicatively coupled to the processor, causes the processor to:
    perform neighbor state management for each neighbor entry of a first set of neighbor entries for a first peer of a Multi-Chassis Link Aggregation Group (MCLAG) such that the first set of neighbor entries is disjunctive from a second set of neighbor entries of a second peer of the MCLAG;
    conduct a portion of communication traffic of the MCLAG with the plurality of neighbors using the first peer based on the neighbor entries of both set of neighbor entries;
    discover a new neighbor;
    perform a neighbor state management load-balancing process to determine a home peer, which is one of the first peer and second peer, for the newly discovered neighbor,
    perform, by the determined home peer, neighbor state management for the newly discovered neighbor, which comprises maintaining reachability information associated with the newly discovered neighbor.

* * * * *